(12) United States Patent
Lee

(10) Patent No.: US 12,691,535 B2
(45) Date of Patent: Jul. 28, 2026

(54) AUTOMATIC CLEANING DEVICE FOR A PATTERN JIG AFTER LASER NOTCHING

(71) Applicant: Kye-Seol Lee, Seoul (KR)

(72) Inventor: Kye-Seol Lee, Seoul (KR)

( * ) Notice: Subject to any disclaimer, the term of this patent is extended or adjusted under 35 U.S.C. 154(b) by 473 days.

(21) Appl. No.: 18/079,439

(22) Filed: Dec. 12, 2022

(65) Prior Publication Data

US 2024/0157405 A1 May 16, 2024

(30) Foreign Application Priority Data

Nov. 16, 2022 (KR) ........................ 10-2022-0153193

(51) Int. Cl.
| | |
|---|---|
| *B23K 37/04* | (2006.01) |
| *A46B 13/00* | (2006.01) |
| *A46B 13/02* | (2006.01) |
| *B08B 1/12* | (2024.01) |
| *B08B 1/32* | (2024.01) |
| *H01M 4/04* | (2006.01) |

(52) U.S. Cl.
CPC ........ *B23K 37/0443* (2013.01); *A46B 13/001* (2013.01); *A46B 13/02* (2013.01); *B08B 1/12* (2024.01); *B08B 1/32* (2024.01); *A46B 2200/3073* (2013.01); *H01M 4/04* (2013.01)

(58) Field of Classification Search
CPC .... B08B 1/12; B08B 1/30; B08B 1/32; B08B 1/50; B08B 1/52; B08B 1/54; B08B 1/20; B08B 1/34; B08B 11/02; B08B 11/00; A46B 13/001; A46B 13/02; A46B 2200/3073; B23K 26/16; B23K 26/362; B23K 37/0443; B23K 26/702; H01L 21/67046; H01M 4/04

USPC ...................................... 15/77, 82, 88.2–88.3
See application file for complete search history.

(56) References Cited

U.S. PATENT DOCUMENTS

| | | | | |
|---|---|---|---|---|
| 3,748,677 | A | * 7/1973 | Frank | .................. H10P 72/0406 451/210 |
| 4,109,337 | A | * 8/1978 | Hillman | .................... B08B 1/34 15/77 |
| 4,213,794 | A | * 7/1980 | Wooding | .................. B08B 1/54 399/99 |
| 6,033,522 | A | * 3/2000 | Iwata | .................... G11B 5/8404 451/302 |

(Continued)

FOREIGN PATENT DOCUMENTS

| | | | |
|---|---|---|---|
| CN | 118806140 A | * | 10/2024 |
| JP | 2001054765 A | * | 2/2001 |

(Continued)

*Primary Examiner* — Laura C Guidotti
(74) *Attorney, Agent, or Firm* — IPLA P.A.

(57) ABSTRACT

An automatic cleaning device of a pattern jig after laser notching includes: a rotary rod coupled to the center of a pattern jig to rotate the pattern jig; a pair of brushes rotatably installed on a side of a brush unit; brush rotation motors for rotating the brushes; left and right brush carriers for carrying the brushes left and right; a vertical brush unit carrier installed at the brush unit to be movable up and down; a forward and backward brush unit carrier coupled to the vertical brush unit carrier and moving the brush unit forward and backward; and a forward and backward laser brush unit carrier coupled to the forward and backward brush unit carrier and moving together with the forward and backward brush unit carrier.

5 Claims, 9 Drawing Sheets

(56)     References Cited

U.S. PATENT DOCUMENTS

| | | | | |
|---|---|---|---|---|
| 2007/0095367 A1* | 5/2007 | Wang | ................ | H01L 21/67046 |
| | | | | 134/33 |
| 2007/0277334 A1* | 12/2007 | McKeown | ................ | B08B 1/36 |
| | | | | 15/88.4 |
| 2008/0223402 A1* | 9/2008 | Haneda | ............... | H10P 72/0412 |
| | | | | 134/115 R |
| 2018/0281753 A1* | 10/2018 | Conny | ................... | A46B 13/02 |
| 2020/0276711 A1* | 9/2020 | Lin | ........................ | B25J 19/023 |
| 2021/0361970 A1* | 11/2021 | Kazic | ................... | A61N 5/0617 |
| 2024/0006648 A1* | 1/2024 | Cho | ....................... | B23K 26/38 |

FOREIGN PATENT DOCUMENTS

| | | | | | |
|---|---|---|---|---|---|
| JP | 2006334084 A | * | 12/2006 | | |
| KR | 20150062847 | | 6/2015 | | |
| KR | 20180004582 A | * | 1/2018 | ............ | H01M 4/139 |
| KR | 20190046208 A | * | 5/2019 | .......... | H05K 3/0026 |
| KR | 102158708 | | 9/2020 | | |
| KR | 114161168 A | * | 3/2022 | ............ | B23D 15/08 |
| KR | 102386254 B1 | * | 4/2022 | ............ | B23K 26/16 |
| KR | 102430493 | | 8/2022 | | |

* cited by examiner

AUTOMATIC CLEANING DEVICE FOR A PATTERN JIG AFTER LASER NOTCHING

CROSS REFERENCE

The present application claims priority to Korean Patent Application No. 10-2022-0153193 the entire contents of which is incorporated herein by reference.

BACKGROUND

The present disclosure relates to an automatic cleaning device of a pattern jig after laser notching and, particularly, to make it possible to remove contaminants such as particles, which adhere to a cut portion of a pattern jig due to high temperature when forming an electrode by notching a film using a laser pattern jig through a laser emitter, using a brush.

In general, as the prices of energy sources increase due to exhaustion of fossil fuel and the interest in environment contamination increases, a secondary battery becomes a necessary factor for the future life with demands for an eco-friendly substitute energy.

An electrode film for forming an electrode assembly is manufactured with a portion applied with an active material, without the other portion applied with an active material, and with an electrode body exposed.

An exposed portion at which an electrode body is exposed in this way is machined to function as an electrode terminal for connecting an anode and a cathode to the outside when an electrode assembly is configured, and in order to enable such machining, the electrode film is formed by applying an active material to a thin plate conductor constituting the electrode body and is not machined to be discriminated.

In general, a notching machine, which is an apparatus that forms a terminal portion by cutting a portion of an exposed portion of an electrode film and a coating portion applied with an active material, forms a terminal portion by cutting a portion of an exposed portion through punching or using a laser.

That is, notching, which is a process of cutting a non-applied portion, which is a portion not applied with anode/cathode active materials of an electrode through slitting, with portion for grounding a tap left, cuts a desired shape from an edge of a material and is characterized in that an outline does not make a closed curve.

Notching machines that use punching was generally used in the related art, but recently, a notching machine that less damages an electrode than punching, can perform effective production, and uses a laser is more increased.

When a laser is used in this way in the related art, working machines should be efficiently arranged in consideration of the path of a laser unlike existing punching machines, but there is a problem that laser efficiency decreases in notching machines at present.

An electrode material part of a secondary battery is divided into an electrode coating portion and an electrode notching portion, and the electrode notching portion is cut into a desired size by a laser.

In the related art, heat is generated at a cut portion in such laser notching, and there is a defect that a lot of fume and particles adhere to and collect at a pattern jig that is a cut portion due to the heat, thereby causing contamination.

SUMMARY OF THE INVENTION

The present disclosure has been made in an effort to solve the defect in the related art described above and an objective of the present disclosure is to provide an automatic cleaning device of a pattern jig after laser notching that removes contaminants adhering to a pattern jig due to heat by automatically rotating a brush after a predetermined time passes, and vacuum-suctions and discharges the contaminants to the outside to cleanly clean the pattern jig.

In order to achieve the objectives of the present disclosure, an automatic cleaning device that forms an electrode notching portion by notching an electrode through a pattern jig using a laser emitter includes: a rotary rod coupled to the center of the pattern jig such that the pattern jig is rotated by a rotary rod actuator; a pair of brushes installed on a side of the brush unit to be rotatable by brush rotation motors; left and right brush carriers for carrying the brushes left and right; a vertical brush unit carrier installed at the brush unit to be movable up and down; a forward and backward brush unit carrier coupled to the vertical brush unit carrier and moving the brush unit forward and backward; and a forward and backward laser brush unit carrier coupled to the forward and backward brush unit carrier and moving together with the forward and backward brush unit carrier.

The present disclosure is characterized in that the pattern jig is rotatably coupled to the forward and backward brush unit carrier through the brush rotation motors and the rotary rod.

The present disclosure has an effect that the brushes can cleanly remove contaminants such as particles, which adhering to a cut portion of a pattern jig due to high temperature when an electrode notching portion is cut by a laser emitter, by automatically rotating, and it is possible to vacuum-suction and discharge the contaminants.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
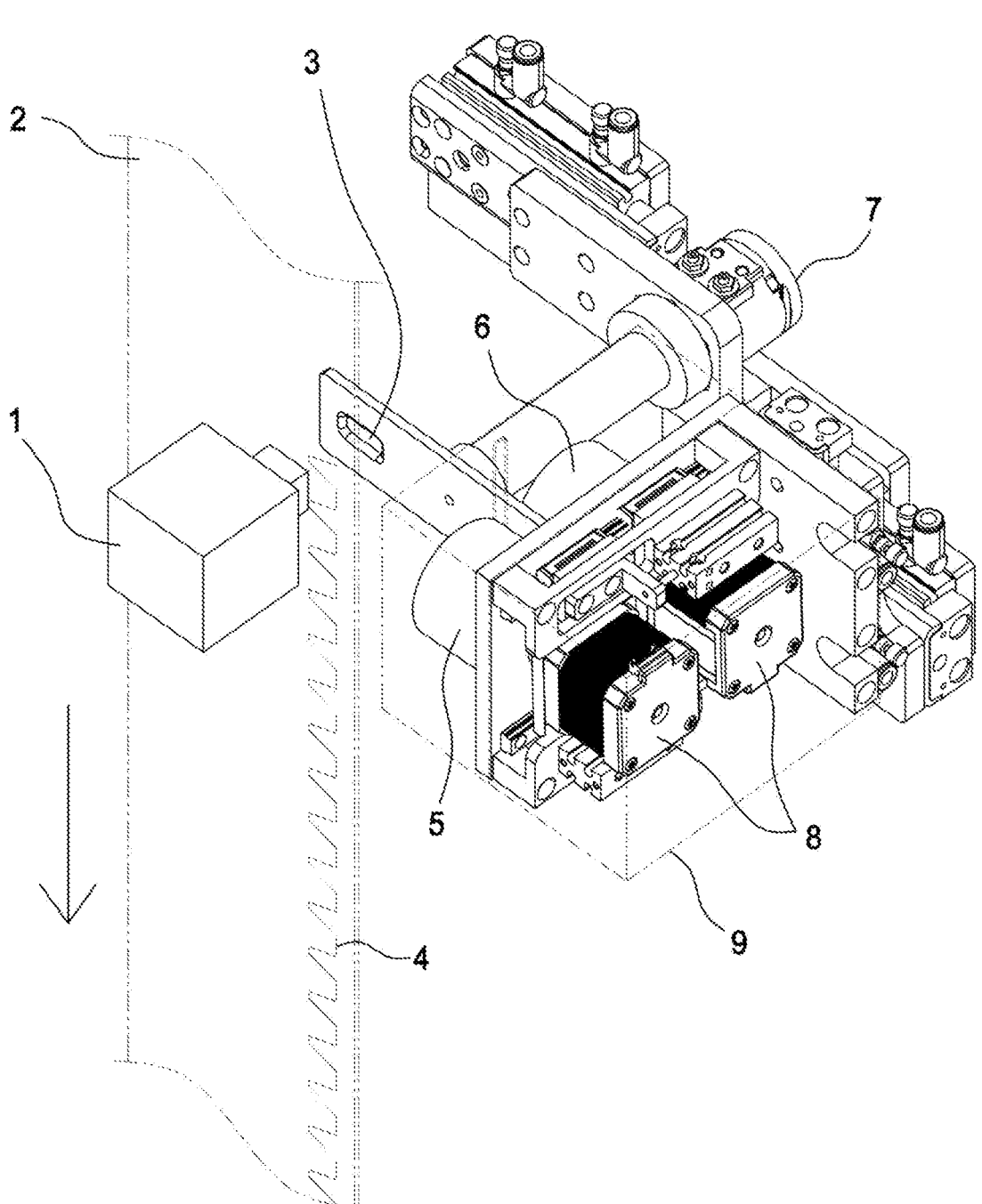
FIGS. 1 and 2 are perspective views of an apparatus for notching a jig through a pattern jig using a laser emitter of the present disclosure.
Figure 2:
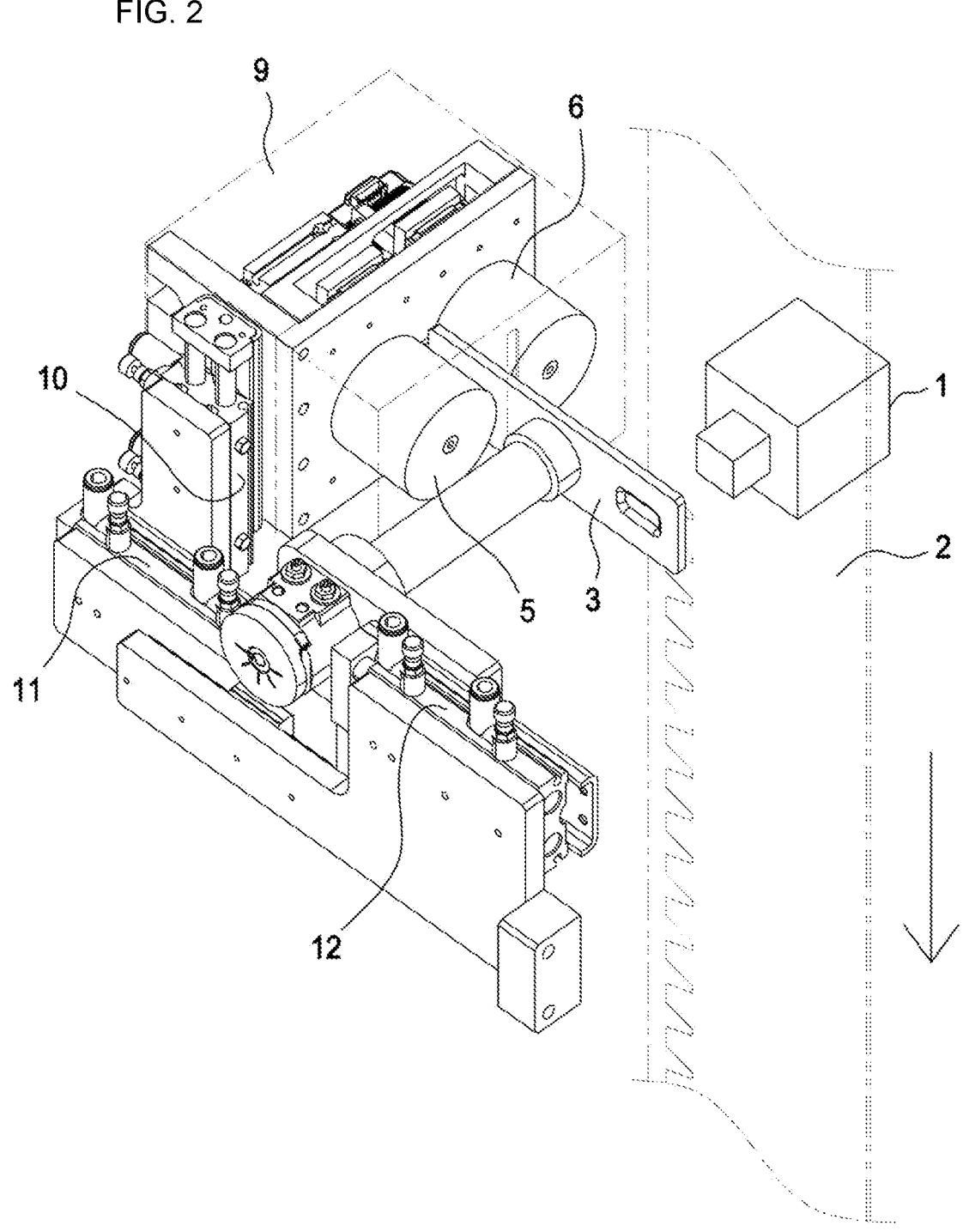
Figure 3:
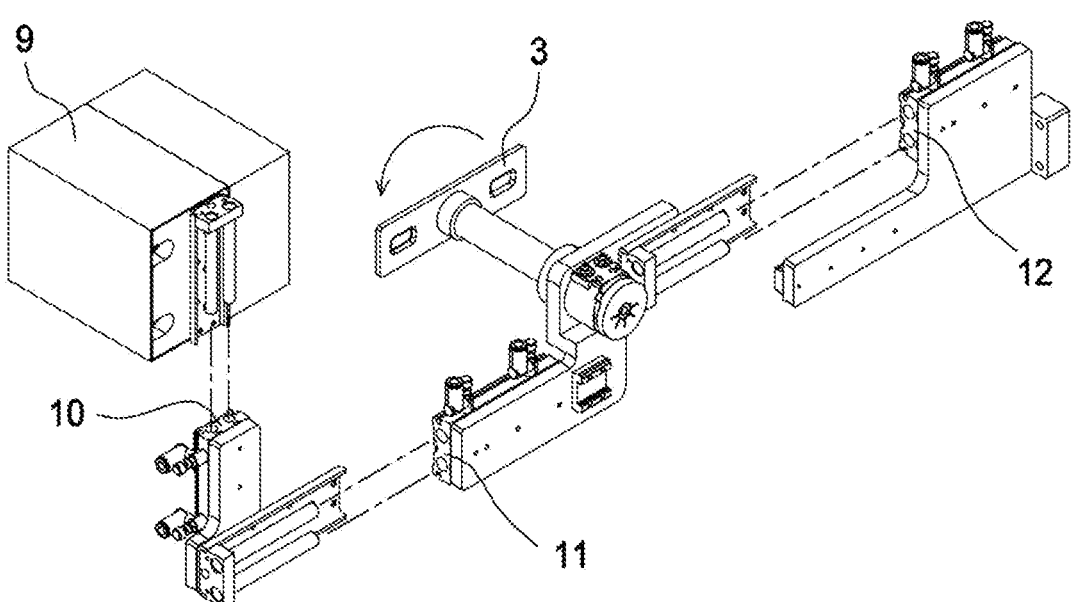
FIG. 3 is a perspective view showing a rotation motion of a pattern jig for cleaning the pattern jig of the present disclosure.

Hereinafter, embodiments of the present disclosure will be described in detail with reference to the accompanying drawings.

An apparatus for notching an electrode using a pattern jig 3 by emitting a laser using a laser emitter 1 includes: a rotary rod 3a rotatably coupled to the center of the pattern jig 3 to rotate the pattern jig 3; a rotation actuator 7 driven to rotate the rotary rod 3a; a brush unit 9 having brushes coupled thereto; a pair of brushes 5 and 6 rotatably coupled to a side of the brush unit 9; brush rotation motors 8 installed in the brush unit 9 to rotate the brushes 5 and 6; left and right brush carriers 8a and 8b for carrying the brushes 5 and 6 left and right; a vertical brush unit carrier 10 installed at the brush unit 9 to be movable up and down; a forward and backward brush unit carrier 11 coupled to the vertical brush unit carrier 10 and moving the brush unit 9 forward and backward; and a forward and backward laser brush unit carrier 12 coupled to the forward and backward brush unit carrier 11 and moving together with the forward and backward brush unit carrier 11, in which the pattern jig 3 is made of stainless steel or tungsten.

Figure 10:
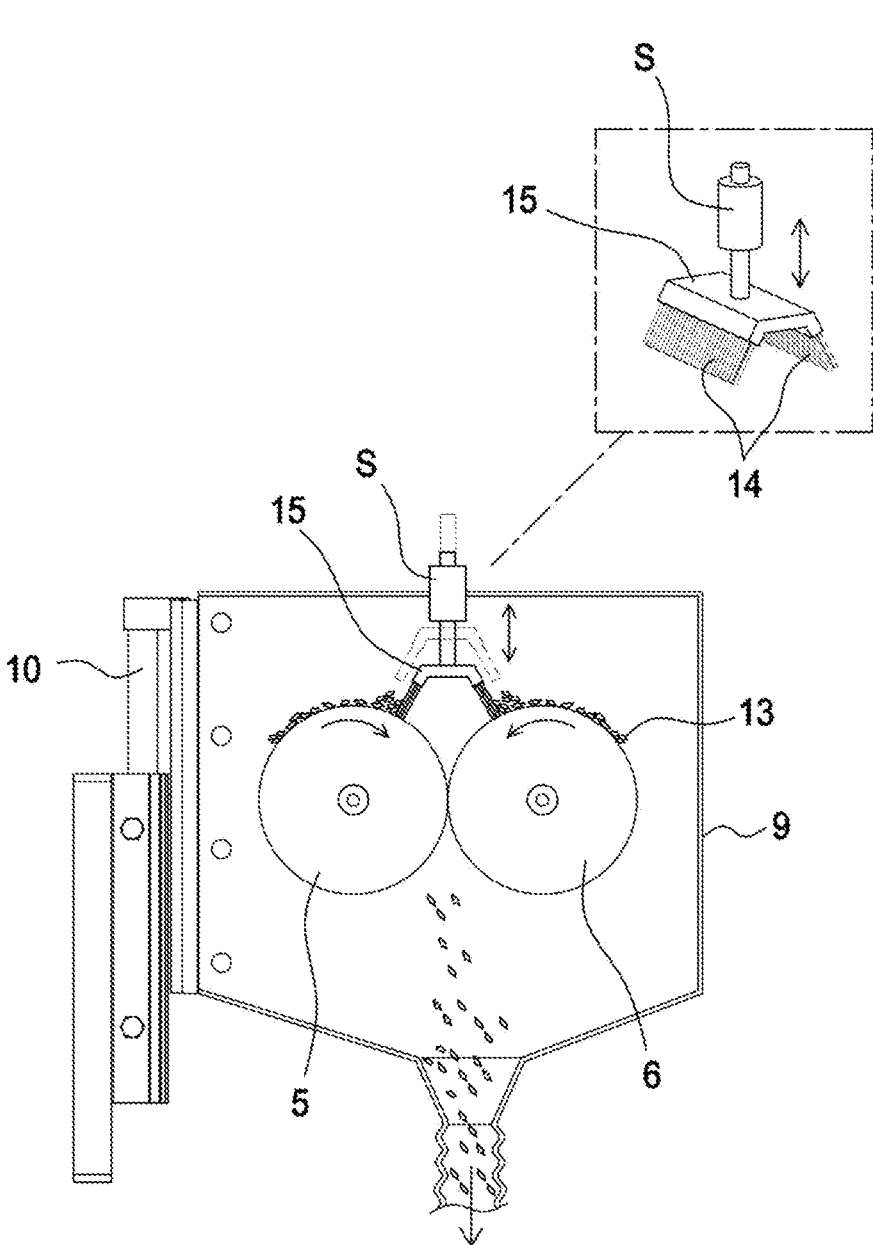
FIG. 10 is a view showing a configuration for cleaning brushes of the present disclosure using a comb.

FIG. 10 is a view showing a configuration for cleaning the brushes 5 and 6 of the present disclosure with a comb 14. A pair of combs 14 is installed to be opened to both sides at the lower end of a bracket 15 that is driven up and down by a solenoid S, so contaminants 13 are cleanly removed by the combs 14 when the brushes 5 and 6 are rotated in different directions in contact with each other.

However, since the combs 14 are installed to be slightly opened to both sides, they are somewhat inserted into the brushes when the brushes 5 and 6 are rotated, so even contaminants in the brushes are cleanly removed.

Operation of the present disclosure having this configuration is described.

Figure 4:
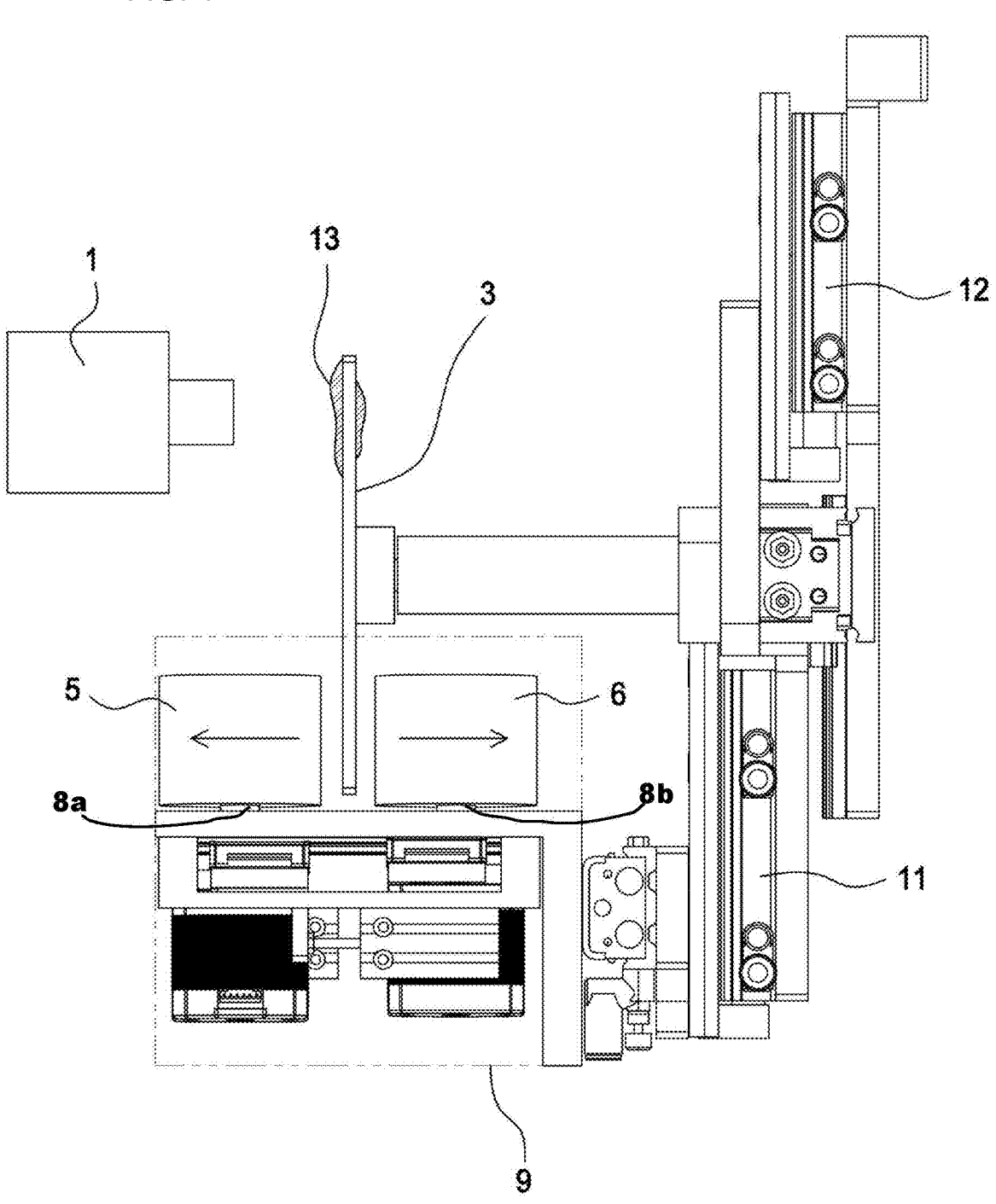
FIG. 4 is a view showing a contaminant removal process of a laser pattern jig of the present disclosure in which brushes are opened left and right.

A process of removing contaminants of a laser pattern jig of the present disclosure, first, opens the brushes 5 and 6 left and right by driving the left and right brush carriers 8a and 8b, as shown in FIG. 4.

Figure 5:
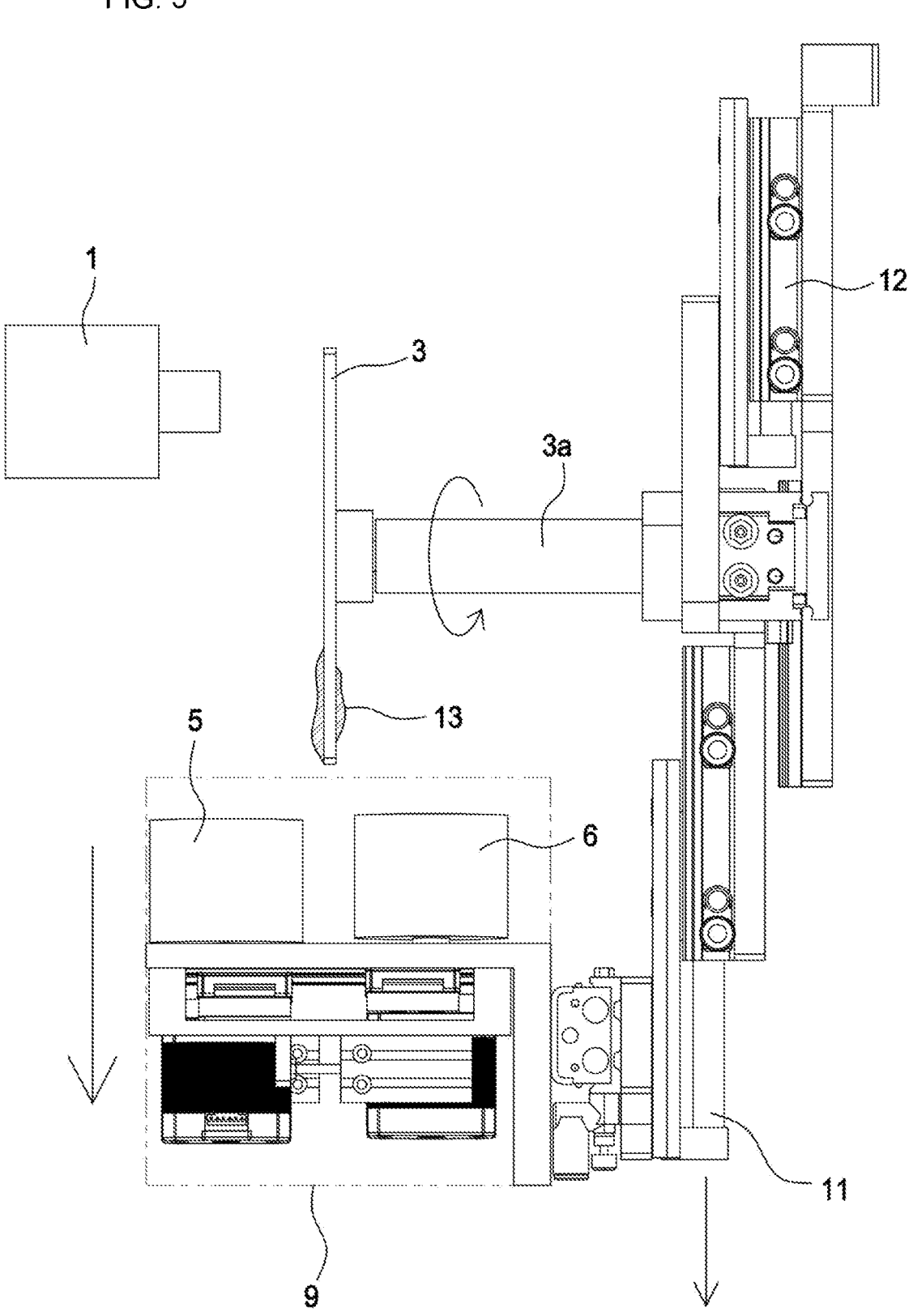
FIG. 5 is a view showing an operation of rotating a contaminated jig toward a brush unit after the brush unit of the present disclosure is moved back.

Thereafter, the forward and backward brush unit carrier 11 is moved backward, as shown in FIG. 5, thereby moving backward the brush unit 9 coupled to the forward and backward brush unit carrier 11.

In this state, the rotary rod actuator 7 rotates the rotary rod 3a such that a contaminated portion of the pattern jig 3 is positioned to face the brush unit 9.

Figure 6:
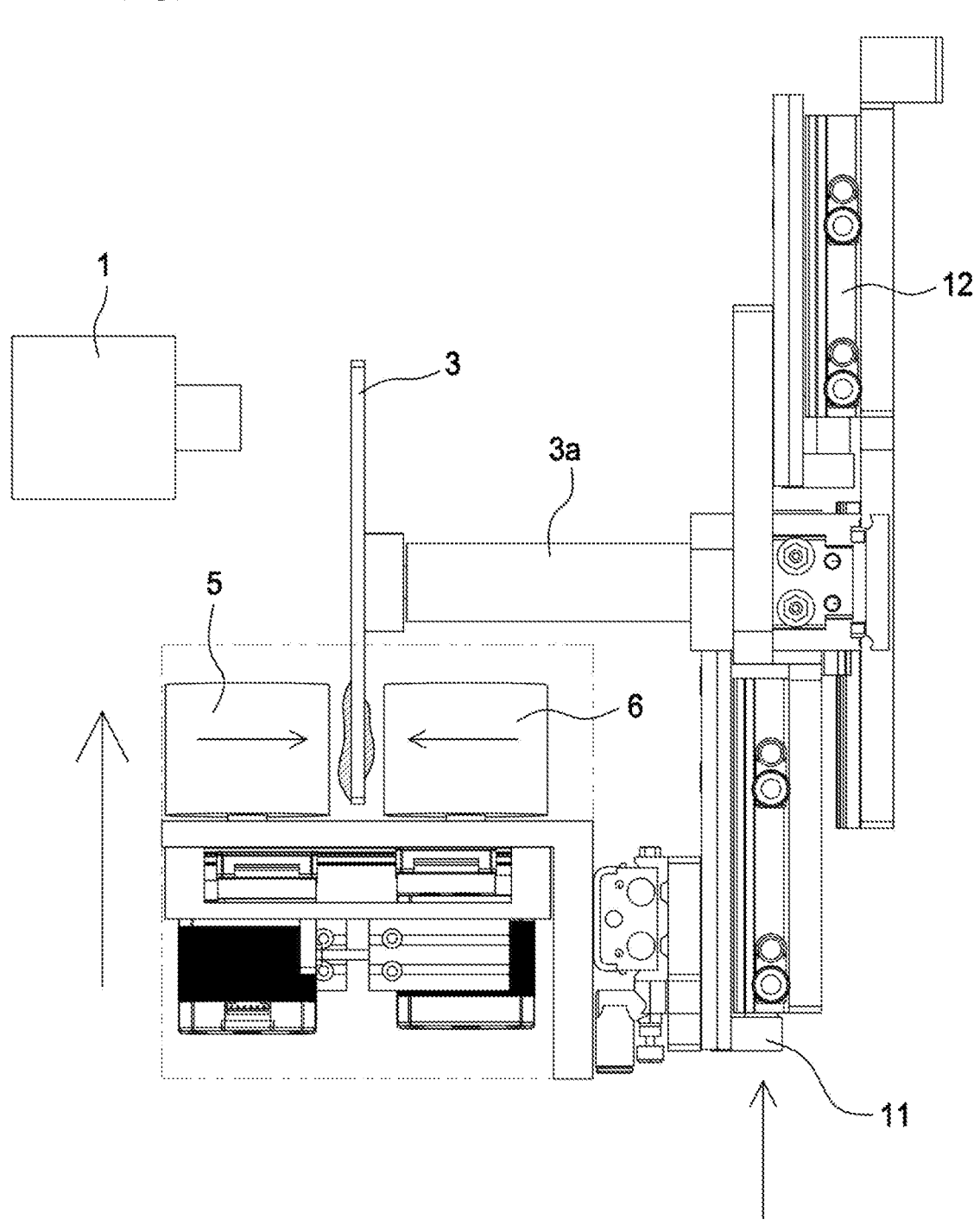
FIG. 6 is a view showing an operation of inserting a contaminated jig between brushes by accommodating the jig by moving forward the brush unit and then moving the brushes left and right.

That is, with contaminants 13 of the pattern jig 3 positioned to face the brush unit, as shown in FIG. 6, the forward and backward brush unit carrier 11 is moved forward, whereby the brush unit 9 is also moved forward and accommodates the pattern jig 3. Further, the brushes 5 and 6 are moved left and right such that the contaminated pattern jig 3 is inserted between the brushes 5 and 6, and the brushes 5 and 6 are rotated by the brush rotation motors 8, thereby removing the contaminants 13 adhering to the pattern jig 3 are removed.

Figure 7:
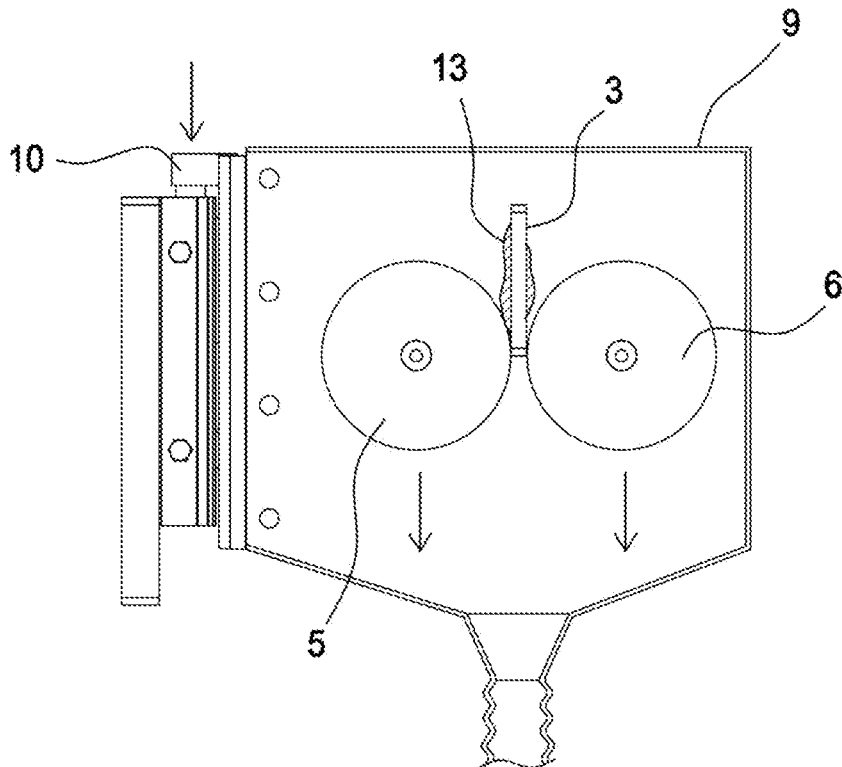
FIGS. 7 and 8 are views showing an operation in which contaminants detached by moving up and down the brush unit of the present disclosure is caught to comb hairs.
Figure 8:
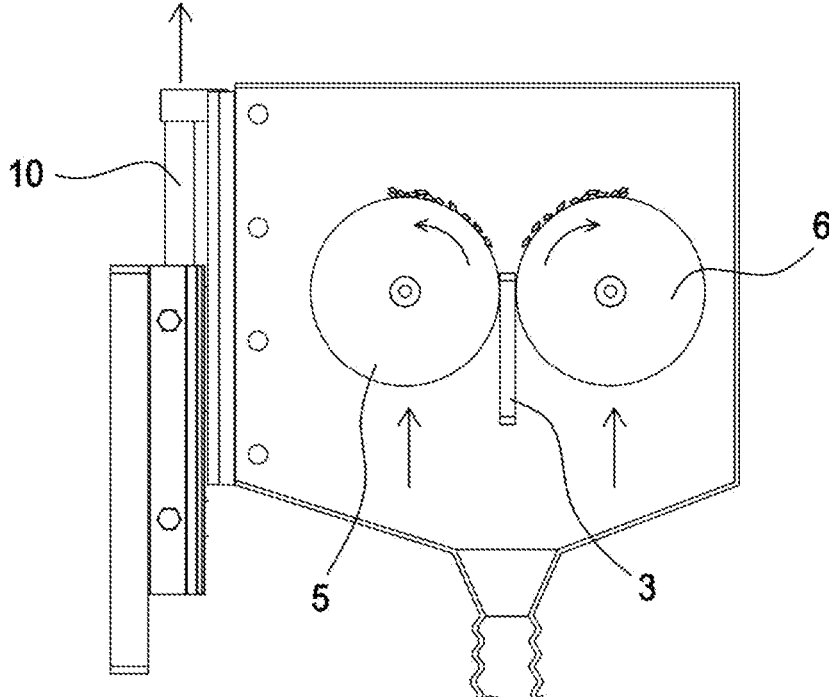

Further, as shown in FIGS. 7 and 8, the brush unit 9 is carried up and down by moving the vertical brush unit carrier 10 up and down, whereby the contaminants 13 adhering to the pattern jig 3 are detached. The contaminants 13 detached by the brushes 5 and 6 in this way stick to the surface of the brushes 5 and 6.

Figure 9:
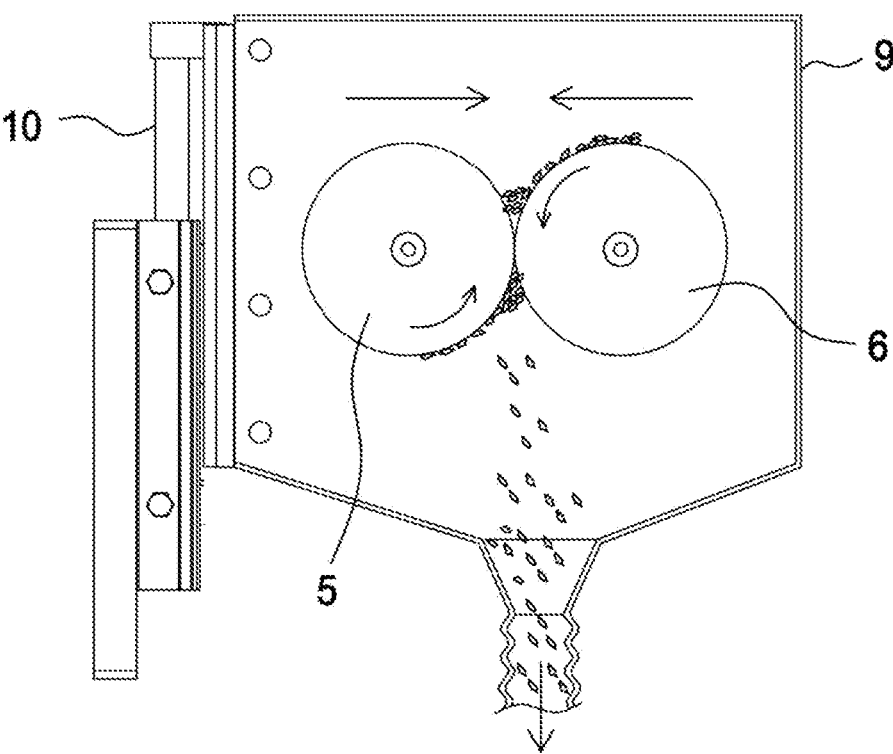
FIG. 9 is a view showing an operation of removing, vacuum-suctioning, and then discharging contaminants by taking a jig out of a brush unit by moving backward the brush unit after opening the brushes left and right, and then by bringing the brushes into contact with each other.

Further, as shown in FIG. 9, the brushes 5 and 6 are opened left and right by driving the left and right brush carriers 8a and 8b, and then the pattern jig 3 is moved out of the brush unit 9 by moving backward the brush unit, and then the brushes 5 and 6 are brought into contact with each other by driving the left and right brush carriers 8a and 8b, and then the brush motors 8 are rotated in the same direction. Accordingly, the brushes 5 and 6 are rotated, as in the figure, whereby the contaminants 13 adhering to the surfaces of the brushes 5 and 6 are easily detached and removed and the contaminants 13 such as particles are vacuum-suctioned and discharged to the outside under the brush unit 9.

The above description merely explains the spirit of the present disclosure and the present disclosure may be changed, modified, and replaced in various ways without departing from the spirit of the present disclosure by those skilled in the art.

Accordingly, the embodiments described herein and the accompanying drawings are provided merely not to limit, but to explain the spirit of the present disclosure, and the spirit of the present disclosure is not limited by the embodiments and the accompanying drawings.

The protective range of the present disclosure should be construed by the following claims and the scope and spirit of the present disclosure should be construed as being included in the patent right of the present disclosure.

What is claimed is:

1. An automatic cleaning device for a pattern jig after the pattern jig has been used for laser notching an electrode with a laser emitted by a laser emitter, the automatic cleaning device comprising:

a rotary rod rotatably coupled to the center of the pattern jig to rotate the pattern jig;

a rotation actuator operatively coupled to the rotary rod to rotate the rotary rod to rotate the pattern jig;

a brush unit including a pair of brushes rotatably coupled to a side of the brush unit;

brush rotation motors installed in the brush unit to rotate the brushes;

left and right brush carriers for carrying the brushes left and right;

a vertical brush unit carrier installed at the brush unit to move the brush unit upward and downward;

a forward and backward brush unit carrier coupled to the vertical brush unit carrier and configured to move the brush unit forward and backward; and a forward and backward laser brush unit carrier coupled to the forward and backward brush unit carrier and moving together with the forward and backward brush unit carrier, wherein in order to remove contaminants of the pattern jig, the pair of brushes are moved away from each other in the left and right direction, the pattern jig is rotated toward the brush unit, and the pair of brushes are brought into contact with the pattern jig by moving forward the brush unit and moving the pair of brushes towards each other in the left and right direction, whereby the brushes are rotated to remove the contaminants from the pattern jig.

2. The automatic cleaning device of claim 1, wherein the pattern jig is rotatably coupled to the forward and backward brush unit carrier through the rotary rod and the rotation actuator.

3. The automatic cleaning device of claim 1, further comprising a pair of combs that are moved up and down by a solenoid, wherein the pair of combs are installed at upper ends of the brushes to clean the brushes when the brushes are rotated in contact with each other.

4. The automatic cleaning device of claim 1, wherein the left and right brush carriers are driven in opposite directions to move the brushes toward each other and away from each other.

5. The automatic cleaning device of claim 1, wherein moving the brushes away from each other comprises driving the left and right brush carriers in opposite directions.

\* \* \* \* \*